United States Patent [19]
Elton et al.

[11] Patent Number: 5,776,611
[45] Date of Patent: Jul. 7, 1998

[54] CROSSLINKED HYDROGEL COATINGS

[75] Inventors: Richard Elton, Glens Falls, N.Y.; Margret Opolski, Carlisle, Mass.

[73] Assignee: C. R. Bard, Inc., Murray Hill, N.J.

[21] Appl. No.: 746,946

[22] Filed: Nov. 18, 1996

(Under 37 CFR 1.47)

[51] Int. Cl.$^6$ .............................. B32B 27/00; B32B 27/40
[52] U.S. Cl. ................... 428/423.1; 427/2.3; 427/388.2; 427/435; 428/425.8; 528/45; 528/52; 528/59; 528/66; 528/75; 604/264; 604/265
[58] Field of Search ................... 427/2.3, 388.2, 427/435; 428/423.1, 425.8; 528/45, 52, 59, 66, 75; 604/264, 265

[56] References Cited

U.S. PATENT DOCUMENTS

| | | | |
|---|---|---|---|
| 4,938,901 | 7/1990 | Groitzsch et al. | 264/101 X |
| 5,104,930 | 4/1992 | Rinde et al. | 524/871 |
| 5,160,790 | 11/1992 | Elton | 428/412 |
| 5,169,720 | 12/1992 | Braatz et al. | 427/2.11 X |
| 5,175,229 | 12/1992 | Braatz et al. | 528/48 |
| 5,179,174 | 1/1993 | Elton | 525/409 |
| 5,290,585 | 3/1994 | Elton | 604/264 X |

*Primary Examiner*—Michael Lusignan
*Attorney, Agent, or Firm*—Morgan & Finnegan, L.L.P.

[57] ABSTRACT

A hydrophilic, lubricious, durable, flexible, coating comprising a crosslinked polyurea matrix complexed with a hydrophilic polymer selected from the group consisting of poly (ethylene oxide) and polyvinylpyrrolidone, said crosslinked polymer formed from the reaction of an isocyanate and a compound having at least two active hydrogens per molecule selected from the group consisting of polyamines, polymercaptans, and polycarboxylates or compounds with NH, $NH_2$, SH or COOH groups on same molecule in the presence of said hydrophilic polymer, with the total sum of the average isocyanate functionality plus the average active hydrogen functionality exceeding 4 and the molar ratio of total NCO groups to total active hydrogens being at least 0.8.

16 Claims, 3 Drawing Sheets

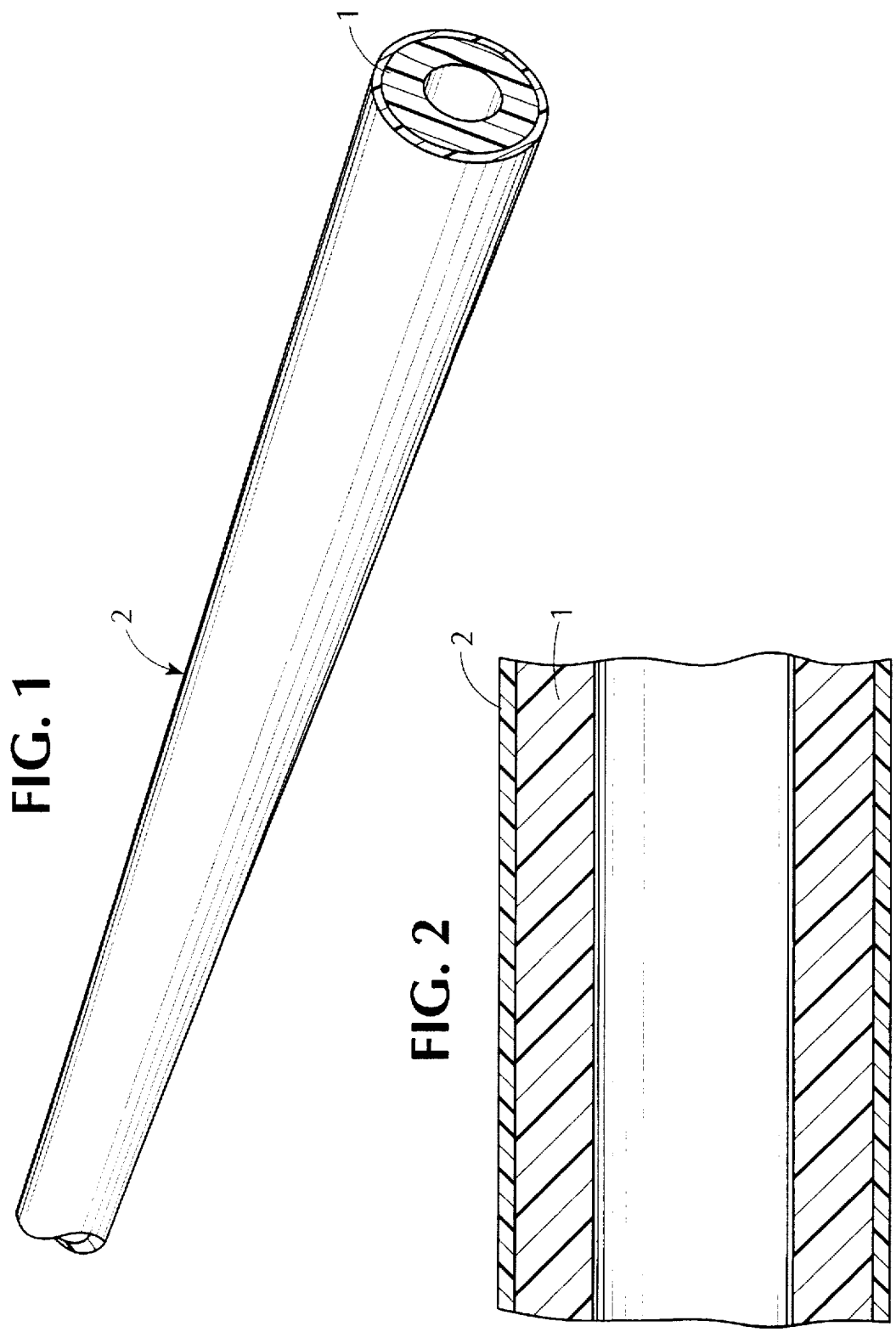

5,776,611

CROSSLINKED HYDROGEL COATINGS

BACKGROUND OF THE INVENTION

It has long been known that hydrophilic coatings with low friction (coefficient of friction of 0.3 or less) are useful for a variety of medical devices such as catheters, catheter introducers, guidewires and the like having an organic substrate or an inorganic substrate. When low friction surfaces are used, the devices, upon introduction into the body, slide easily within the arteries, veins, cannula and other body orifices and passageways. There have been a wide variety of methods used to provide the surfaces desired. In some cases the material of the catheter or medical device is formed of a material having good anti-friction properties such as poly(tetrafluoroethylene) or other plastics which tend to avoid abrasion with the body. However, in many cases the selection of materials does not provide the anti-slip properties desired in conjunction with other desirable properties of the particular medical device. In other cases the desired adherence to a particular substrate is not achieved.

The art has recognized that polymer surfaces can be provided with hydrophilic coatings formed by the combinations of certain polymers, both non-crosslinked and crosslinked with a hydrophilic polymer like polyvinylpyrrolidone (PVP) or poly(ethylene oxide) (PEO).

For example, U.S. Pat. No. 5,077,352, 5,160,790, 5,179,174 and 5,290,585 to ELTON discloses a flexible, lubricous organic coating formed by applying a mixture of an isocyanate, a polyol, a hydrophilic polymer like poly(ethylene oxide) (PEO) or polyvinylpyrrolidone (PVP) and a carrier liquid to a surface to be coated. The carrier liquid is removed and the mixture reacted to form a lubricious, flexible homogenous coating of crosslinked polyurethane linkages complexed with PVP or PEO particularly suitable for use as a protective lubricious coatings on medical devices introduced into the body. The coating of the aforementioned patents exhibit a significantly reduced coefficient of friction when exposed to water or aqueous solutions. While they exceptionally adhere to many organic substrates and will adhere to a number of inorganic substrates they are not particularly durable on metal substrates or other applications under high wear conditions.

Another type of lubricious coating besides the coatings of the earlier mentioned ELTON patents that have been available in the prior art are those coating systems which require two different applications, the first application of which is to deposit a layer of material which subsequently reacts with material applied after a second application, or which reacts with moisture after material is applied by a second application. As such it is difficult to control the exact composition of the final coating, because the composition is a complex function of several factors, such as the amounts of each of the coating solutions that happen to deposit on the substrate, the amount of the first reactive coating that happens to react with other material before the top coat is applied, or the amount of the first coating that re-dissolves when the second coating is applied, etc. Coating composition uniformity of these two step coatings is further complicated because, during dip coating, different parts of the same object are likely to see different dwell times and therefore the amount of the first component that re-dissolves is variable. Two step coating processes are also more complex and more time, labor, and material intensive.

Examples of prior art patents disclosing the above-mentioned multi-step coating systems are U.S. Pat. Nos. 4,943,460, 4,729,914, 4,119,084, 4,876,126, 4,100,309, 4,980,231, 4,642,267, 4,459,317, 4,487,808, 4,373,009, 4,585,666 and 4,666,437.

For the purpose of providing some specific prior art of the above-mentioned type U.S. Pat. Nos. 4,459,317, 4,487,808 and 4,585,666 to Lambert will now be discussed.

U.S. Pat. Nos. 4,459,317 and 4,487,808 to Lambert disclose medical devices having hydrophilic coatings formed from an isocyanate layer overcoated with poly(ethylene oxide) layer. Coatings of polyurea materials are formed from a first solution of an isocyanate being applied to a substrate with a solvent evaporated, followed by a second solution application of poly(ethylene oxide) in turn followed by evaporation of the solvent. Cure is effected by baking in the presence of moisture, thus producing a polyurea. This type of application appears to provide polyurea materials which do not have the same desired tenacity of the coatings to substrates as do the coatings of the present invention. It should be realized that the poor adhesion durability of aforementioned polyurea coatings is not due to the chemical polyurea nature of the coatings but rather because they are produced by a multistep procedure resulting in a difficult to control two layer structure coating composition which presumably has a substantial amount of free or poorly complexed PEO or PVP.

U.S. Pat. No. 4,585,666 to Lambert discloses medical devices having hydrophilic coatings formed from an isocyanate layer overcoated with a polyvinylpyrrolidone layer. Such coatings are of polyurea materials formed from a first solution of an isocyanate being applied to a substrate, the solvent then evaporated, followed by a second solution application of a polyvinylpyrrolidone, in turn followed by evaporation of the solvent. Cure is effected by baking, in the presence of moisture, thus producing a polyurea. This type of application provides polyurea materials which do not have the tenacity of the coatings of the present invention. Additionally, as pointed out earlier, the multistep procedure that is employed makes it difficult to obtain coatings having consistent properties.

Other examples of lubricious coating systems in the prior art are those coatings which contain a water soluble hydrophilic polymer like PEO or PVP in a thermoplastic binder. Examples of such coating systems are those disclosed in U.S. Pat. No. s 4,990,357, 5,041,100 and 5,084,315. In coatings of the aforementioned type the water soluble polymer is not well complexed and can lose lubricity over a prolonged period of time.

Another prior art thermoplastic coating composition is the thermoplastic coating disclosed in U.S. Pat. No. 4,810,543 in which a non-crosslinked thermoplastic coating is applied as a solvent solution. While such a coating does provide lubricity it does not afford the high adhesion and high durability that is required in certain applications.

U.S. Pat. 4,642,267 to CREASY et al. discloses a coating which is a simple blend of thermoplastic polyurethane and PVP. When deposited on a substrate and dried, no reactions occur. The coating does not bond to the plastic substrate, and can readily be redissolved in a solvent. Furthermore, the PVP is only lightly complexed, thus allowing the coatings to become generally soft and readily removed when wet.

The present invention like the systems of earlier mentioned U.S. ELTON Pat. Nos. 5,077,352, 5,160,790, 5,179,174 and 5,290,585 is a crosslinked system. Unlike the coatings of the aforementioned ELTON patents, the crosslinked matrix polymer of the present invention resulting from the reaction of an isocyanate, an active hydrogen containing compound containing at least two hydrogens per molecule in the presence of PEO or PVP is not a polyurethane but a crosslinked polymer formed in situ during the curing step and to which the PEO or PVP is complexed. In accordance with the present invention, the stoichiometric ratio of total NCO groups in the isocyanate to total active hydrogen groups in the active hydrogen containing compound is such that the resulting matrix polymer is a crosslinked polyurea. While the coatings of this invention wherein the hydrophilic polymer is PEO or PVP have good adherence to organic substrates in the same manner as those of the above U.S. ELTON patents, it has been found that the coatings of this invention wherein the hydrophilic polymer is PEO have an unexpectedly high adherence to inorganic substrates, such as, for example, metals such as stainless steel of guidewires and other devices having an inorganic substrate. The coatings of the present invention wherein the hydrophilic polymer is PVP have been found to provide suitable lubricating and higher adhesion durability over those coatings of the above-mentioned ELTON patents when applied to metals when the hydrophilic polymer is PVP.

Also, the coating system of the present invention avoids the problems discussed earlier when multi step coating systems exemplified by the earlier discussed U.S. LAMBERT Pats. 4,459,317, 4,487,808 and 4,585,666 are employed.

BRIEF DESCRIPTION OF THE DRAWINGS

FIG. 1 is a perspective view of a medical tubing containing a lubricious crosslinked polyurea-PEO or crosslinked polyurea-PVP coating of this invention.

FIG. 2 is a cross-sectional view of a length of the coated tubing of FIG. 1.

SUMMARY OF THE INVENTION

Figure 3:
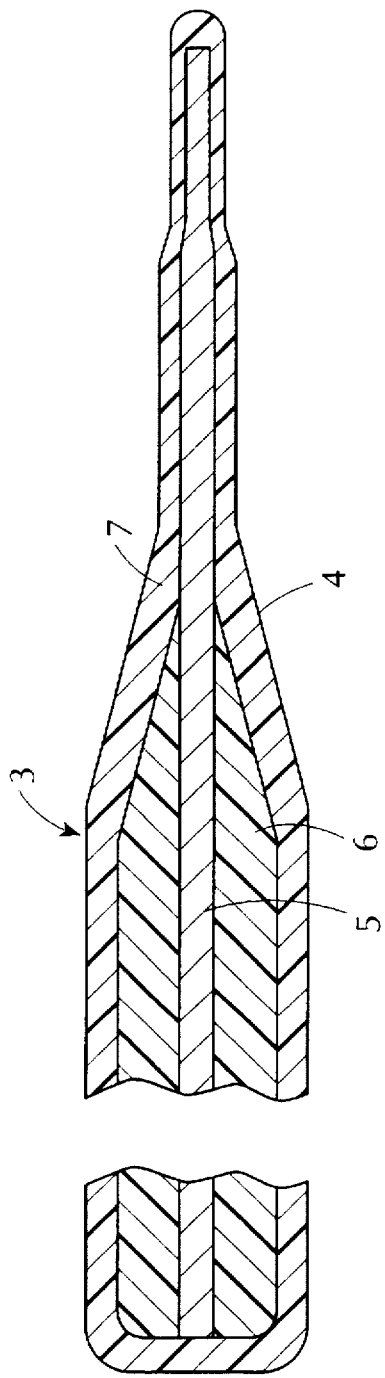
FIG. 3 is a cross-sectional view of a plastic medical guidewire containing a lubricious crosslinked polyurea-PEO or crosslinked polyurea-PVP coating of this invention.

It is an object of this invention to provide a hydrophilic, lubricous organic coating which exhibits a significantly reduced coefficient of friction when exposed to water or aqueous solutions.

It is another object of this invention to provide a hydrophilic, extremely lubricious organic coating which retains its lubricity when wetted even after prolonged contact to water or aqueous solutions, and even after repeated moistening/drying cycles.

It is an object of this invention to provide a hydrophilic, lubricious organic coating which has good adherence to substrates, particularly inorganic substrates.

Another object of this invention is to provide a hydrophilic, lubricious coating which has high durability and has been found to provide adequate lubricity and improved durability when applied to metals.

It is another object of this invention to provide coatings in accordance with the preceding objects which are particularly useful for application to outer inorganic surfaces of medical devices with good adherence to the devices and which are non-toxic and non-deleterious to the body.

Another object of this invention is to provide a method of applying a hydrophilic, extremely lubricious organic coating having the qualities set forth in the preceding objects, which method can be carried out using a single coating solution.

Another object of this invention is to provide a coating, the composition of which is readily controllable and which composition remains essentially constant over its entirety.

It has been found that the objects of this invention may be realized by forming a coating on a suitable substrate by applying to the substrate a solvent solution containing the following necessary components:

1. A high molecular weight poly(ethylene oxide), referred to as PEO, with a weight average molecular weight of 50,000 or greater or a high molecular weight polyvinylpyrrolidone, referred to a PVP, having a number average molecular weight of 50,000 or greater.
2. An isocyanate prepolymer or monomer containing at least two (2) NCO groups per molecule.
3. An active hydrogen containing compound having at least two (2) active hydrogens per molecule, selected from the group consisting of polyamines, polymercaptans, polycarboxylates, or compound with combination of NH, SH or COOH groups on the same molecule.
4. A solvent or blend of solvents capable of dissolving components 1-3.

The total sum of the average isocyanate functionality plus the average active hydrogen functionality must exceed 4 so that the reaction between the isocyanate and active hydrogen containing species produces a crosslinked matrix.

In addition to the compounds listed in 3 above, other active hydrogen containing compounds containing 2 or more active hydrogens per molecule may also be included. Such compounds may include polyols or compounds containing a combination of OH and NH, SH or COOH or other active hydrogen groups.

DESCRIPTION OF THE PREFERRED EMBODIMENTS

The molar ratio of total NCO groups to active hydrogens should be 0.8 or greater, preferably between 1.1 and 3.0. Coatings prepared using NCO/active hydrogen molar ratios greater than 1.0 will result in the formation of additional polyurea, which appears beneficial in applications where coatings with higher durability are desired and for those on more rigid substrates.

The weight ratio of crosslinked polymer matrix to PEO or PVP may be in the range of 0.7 to 5.0 and preferably between 1.0 and 2.0 for most applications.

In addition to components 1-4, other additional additives and modifiers may be included to produce beneficial or desirable effects, as might commonly be employed in coating science. Such additives might include viscosity modifiers, surface active agents, anti-blocking agents, bioactive substances such as antimicrobial agents, pigments, etc.

The coating system is applied as a solvent solution to a substrate of interest, such as a medical guidewire or catheter.

Methods which are commonly practiced in coating technology, such as dipping, spray coating, die wiping, etc. may be employed.

The wet coating is allowed to dry, either under ambient conditions or at elevated temperatures. The isocyanate and polyol are then allowed to react producing a crosslinked polymer matrix in the presence of the PEO or PVP. This cross linking reaction can be carried out at ambient conditions, or preferably at elevated temperature. For those coatings where the NCO to active hydrogen ratio is greater than 1.0, final cure is obtained through reaction with water, either atmospherically or directly supplied to produce polyurea bonds.

The coating composition is essentially uniform throughout. The PEO and PVP is well complexed by the crosslinked polyurea polymer matrix, presumably as a result of the following beneficial effects:

1. The long PEO or PVP chains are physically entrapped in the crosslinked polyurea polymer network.
2. The hydrophilic PEO or PVP molecules are complexed because of the numerous opportunities for hydrogen bonding to occur between the N-H hydrogens formed in the crosslinked polyurea polymer matrix at the sites resulting from the NCO and active hydrogen reaction and the electron donor sites on the PEO or PVP. The PEO sites are the ether oxygens and the PVP sites are the carboxyl oxygens.

Regardless of the exact mechanisms involved in the coatings containing PEO or PVP of the present invention, the result is a durable, flexible coating which bonds well to a variety of substrates including many plastics and metals such as stainless steel.

In contact with water or aqueous solutions, the coating hydrates and becomes slippery. The coating retains a high degree of durability when wet, as evidenced by its ability to remain slippery and bonded to the substrate after repeated cycles of rubbing. In particular, these coatings containing PEO as the hydrophilic polymer exhibit highly desirable durability on hard substrates such as steel wires. Typically, hard substrates often pose durability problems for other hydrophilic coatings, as the forces involved during rubbing can cause many hydrophilic coatings to wear off easily, when these coatings are present on hard substrates.

The PEO or PVP in these coatings appears to be well complexed and is retained indefinitely even when the coating remains hydrated for extended periods. Prolonged hydration does not result in any significant loss of lubricity or durability. The coatings may also be subjected to repeated cycles of wetting and drying without any loss of properties.

These coatings may be formulated to handle a wide range of product applications by varying the following parameters:

1. The molar ratio of NCO to active hydrogen.
2. The weight ratio of crosslinked polyurea polymer matrix to PEO or PVP.
3. The particular compound used to provide the active hydrogen, or the NCO.
4. The functionality of the NCO or active hydrogen containing species.

Thus, a wide variety of properties are achievable from coatings with high elongation to ones which are hard and durable and coatings may be formulated for adhesion to specific substrates.

As indicated earlier, the coatings of the present invention wherein the hydrophilic polymer is PEO provide a beneficial combination of good durability, abrasion resistance and good adhesion to metals such as stainless steel. This has been problematic or impossible with many of the known lubricious coatings. Coatings covered by this invention wherein the hydrophilic polymer is PEO or PVP can also be formulated for good adhesion, abrasion resistance and durability on many plastics and elastomeric materials as well.

After applying the coating solution, the solvent is preferably allowed to evaporate from the coated substrate often by exposure to ambient conditions of from 1 to 480 minutes. It is preferable to accomplish this evaporation in such a manner as to minimize the accumulation of water in the uncured coating film resulting from hygroscopic attraction of atmospheric moisture to the PEO or PVP. This can be accomplished readily by minimizing the evaporation time, reducing the ambient humidity, elevating the ambient temperature for drying, or using a combination of these methods.

The coating is subsequently cured. The cure time and temperatures vary with the choice of isocyanate and polyol and the composition of the substrate. This choice of ingredients also affects the physical properties of the overall coating.

Curing temperatures may range from 75° F. to 350° F. although generally an elevated temperature of 180° to 250° F. is desirable. Cure times may vary from 2 minutes to 72 hours, depending upon the reactivity of the isocyanate and active hydrogen containing compound and the cure temperature. In all cases the cure conditions are to be non-deleterious to the underlying substrate.

After the coating is cured, it is preferable to rinse or soak the coating in water to remove any uncomplexed PEO or PVP. Generally, a brief rinse of 10 to 15 seconds is sufficient, however, a longer rinse or soak is acceptable since the coating is cured and forms a stable gel when in contact with water. After the rinse, the coating may be dried either at ambient conditions, or at elevated temperatures.

After the coating is formed, the coating can imbibe water from an aqueous solution prior to introduction to the body and can become lubricious. Alternatively, the coating can imbibe water solely from body fluids, even if not introduced to water prior to introduction into the body. It can be dried and remoistened repeatedly and it will retain its lubricating properties. In all cases, the materials are selected so as to be compatible with the body and non-toxic to the body, if the coating is to be used in a body related application as in metallic guidewire catheters, introducer tubes and the like.

Isocyanates having at least 2 unreacted isocyanate groups per molecule may be used and include but are not limited to polymethylenepolyphenyl isocyanate, 4,4'-diphenyhnethane diisocyanate and position isomers thereof, 2,4-toluene diisocyanate and position isomers thereof, 3,4-dichlorophenyl diisocyanate and - isophorone di-isocyanate and adducts or prepolymers of isocyanates and polyols such as the adduct of trimethylolpropane and diphenylmethane diisocyanate or toluene diisocyanate. Preferably, an adduct or isocyanate prepolymer, such as that available as Vorite 63 from Caschem Inc., is used. For further examples of polyisocyanates useful in this invention see the ICI Polyurethanes Book, George Woods, published by John Wiley and Sons, New York, N.Y. (1987) and Encyclopedia of Polymer Science and Technology, H. F. Mark, N. G. Gaylord and N. M. Bikales (eds.), (1969) and incorporated herein by reference.

Preferred active hydrogen species include triethyleneglycoldamine available as Jeffamine EDR-148 (Texaco Chemical, Bellaire, Tex.); polyetherdiamines such as Jeffamine ED-600, Jeffamine ED-900 and Jeffamine ED-2001 (Texaco Chemical); polyethertriamines such as Jeffamine T-403; urea condensates of polyetheramines such as Jeffamine DU-700; and amine terminated polypropyleneglycols such as Jeffamine D-400 and Jeffamine D-2000.

Heterocyclic diamines and amine adducts of the same may work well in some applications, such as products YSE-CURE F-100, B-002, and N-002 (available from Ajinomoto, USA, Teanick, N.J.). Also useful are urethane modified melamine polyols containing both amine and hydroxyl groups, available as Cylink HPC (Lytec Industries, West Patterson, N.J.).

Examples of useful polysulfides containing 2 or more SH groups per molecule include polymers of bis-(ethylene oxy) methane containing disulfide linkages, such as LP-3, LP-32, and LP-33 available from Morton Thiokol Corporation.

The (PEO) poly(ethylene oxide) useful in accordance with this invention preferably has a weight average molecular weight of from about 50,000 to 5,000,000.

The (PVP) polyvinylpyrrolidone useful in accordance with the present invention preferably has a number average molecular weight of from about 50,000 to 2.5 million. PVP having a number average molecular weight of about 360,000 is preferred. Examples of polyvinylpyrrolidone materials useful in this invention are those available from BASF Corp., Parsippany, N.J. as Kollidon 90, Luviskol K90, Luviskol K80 and Luviskol K60, and those available from GAP Corporation, as Plasdone 90, PVP K90 and PVP K120.

Commercially available polyvinylpyrrolidone products usually contain approximately 3–5% (w/w) water. Furthermore, polyvinylpyrrolidone is very hygroscopic, and tends to accumulate water on normal storage when exposed to air. Since water is very reactive toward isocyanates, it is preferred, but not essential, to reduce the water content to less than 0.5% prior to use in preparing coating formulations. This may be readily accomplished by vacuum drying an appropriate quantity of polyvinylpyrrolidone, for example, by heating it for eighteen hours at 200° F., while maintaining a vacuum of 27 inches of mercury.

The solvents used are those that do not react with the isocyanate, active hydrogen containing compound or the polyethylene oxide or polyvinylpyrrolidone but are solvents for all. The solvents should be free of reactive groups such, for example as active hydrogens and should be dry, i.e., moisture content 0.05% (w/w) or less. The solvent must further be capable of dissolving the isocyanate, active containing hydrogen compound and poly(ethylene oxide) or polyvinylpyrrolidone. Preferred solvents available commercially in a suitably dry form include but are not limited to methylene chloride, dibromomethane, chloroform, dichloroethane, and dichloroethylene. When methylene chloride is used, the solids content of the coating solution may be 0.5% to 15% (w/w) and preferably 1% to 4% (w/w). When dibromomethane is used, the solids content of the coating solution may be 0.25% to 10% (w/w) and preferably 0.75% to 2% (w/w). Other solvents meeting the above objectives are also suitable.

Viscosity and flow control agents may be used to adjust the viscosity and thixotropy to a desired level. Preferably the viscosity is such that the coating can be formed on the substrate at the desired thickness. Viscosities of from 50 to 500 cps can be used although higher or lower viscosities may be useful in certain instances. Viscosity control agents include but are not limited to fumed silica, cellulose acetate butyrate and ethyl acrylate/2-ethyl hexyl acrylate copolymer. Flow control agents are preferably used in amounts from 0.05 to 5 percent by weight of dry coating solids.

Antioxidants are used to improve oxidative stability of the cured coatings and include but are not limited to tris (3,5-di-t-butyl-4-hydroxy benzyl) isocyanurate, 2,2'-methylenebis (4-methyl-6-t-butyl phenol), 1,3,5-Trimethyl-2,4,6-tris (3,5-di-t-butyl-4-hydroxybenzyl) benzene, butyl hydroxy toluene, octadecyl 3,5, di-t-butyl-4-hydroxyhydrocinnamate, 4,4 methylenebis (2,6-di-t-butylphenol), p,p-dioctyl diphenylamine and 1,1,3-tris-(2-methyl-4-hydroxy-5-t-butylphenyl) butane. Antioxidants are preferably used in amounts from 0.01 to 1 percent by weight of dry coating solids.

Conventional pigments can be added to impart color or radiopacity, or to improve appearance of the coatings.

Air release agents or defoamers include but are not limited to polydimethyl siloxanes, 2,4,7,9-tetramethyl-5-decyn-4,7-diol, 2-ethylhexyl alcohol and n-beta-aminoethyl-gamma-aminopropyl-trimethoxysilane. Air release agents are often used in amounts from 0.0005 to 0.5 percent by weight of dry coating solids.

As indicated earlier the coatings of the present invention using PEO as the hydrophilic polymer may be particularly advantageously used with inorganic substrate such, for example, metals like metal wires, glass medical devices, etc.

The organic substrates that can be coated with the coatings of this invention using PEO or PVP as the hydrophilic polymer include polyether block amide, polyethylene terephthalate, polyetherurethane, polyesterurethane, other polyurethanes, natural rubber, rubber latex, synthetic rubbers, polyester-polyether copolymers, polycarbonates, and other organic materials. Some of these materials are available under the trademarks such as Pebax available from Atochem, Inc. of Glen Rock, N.J. Mylar available from E.I. duPont deNemours and Co. of Wilmington, Del., Texin 985A from Mobay Corporation of Pittsburgh, Pa., Pellethane available from Dow Chemical of Midland, Mich., and lexan available from General Electric Company of Pittsfield, Mass.

The invention is further illustrated by the following examples:

Examples of Crosslinked Polyurea/PEO and Crosslinked Polyurea/PVP Coatings

EXAMPLE 1

A crosslinked polyurea/PEO coating formulation was prepared by weighing the following components into a disposable plastic container:

(a) 2.16 grams of a polyfunctional amine available as Jeffamine ED 2001 (Texaco Chemical Co.);

(b) 1.90 grams of a 60% solution of a trimethylolpropane-toluene diisocyanate adduct in PMA solvent available as Mondur CB-60N (Bayer Corp.);

(c) 100 grams of a 3.3% solution of poly(ethylene oxide) mean molecular weight 300,000 available as Polyox WSR-N750 (Union Carbide Corp.);

(d) 96 grams of methylene chloride.

A length of stainless steel wire approximately 0.016 inches in diameter was dipped into this coating solution during 90 seconds. It was then allowed to air dry for approximately 60 minutes. Following this the coated wire was baked for 60 minutes at 200° F. to effect the cure of the coating.

The resulting product was a wire with a flexible adherent coating that, when wetted with water became noticeably lubricious. Repeated rubbing of the wire under running water with moderate finger pressure did not reduce the coating lubricity appreciably.

EXAMPLE 2

A crosslinked polyurea/PEO coating formulation was prepared by weighing the following components into a disposable plastic container:

(a) 1.19 grams of a polyfunctional amine available as Jeffamine ED 600 (Texaco Chemical Co.);

(b) 3.51 grams of a 60% solution of a trimethylolpropane-toluene diisocyanate adduct in PMA solvent available as Mondur CB-60N (Bayer Corp.);

(c) 100 grams of a 3.3% solution of poly(ethylene oxide) mean molecular weight 300,000 available as Polyox WSR-N750 (Union Carbide Corp.);

(d) 95 grams of methylene chloride.

A length of stainless steel wire approximately 0.016 inches in diameter was dipped into this coating solution during 90 seconds. It was then allowed to air dry for approximately 60 minutes. Following this the coated wire was baked for 60 minutes at 200° F. to effect the cure of the coating.

The resulting product was a wire with a flexible adherent coating that, when wetted with water became noticeably lubricious. Repeated rubbing of the wire under running water with moderate finger pressure did not reduce the coating lubricity.

EXAMPLE 3

A crosslinked polyurea/PEO coating formulation was prepared by weighing the following components into a disposable plastic container:

(a) 0.86 grams of a polyfunctional amine available as Jeffamine C 346 (Texaco Chemical Co.);

(b) 4.14 grams of a 60% solution of a trimethylolpropane-toluene diisocyanate adduct in PMA solvent available as Mondur CB-60N (Bayer Corp.);

(c) 100 grams of a 3.3% solution of poly(ethylene oxide) mean molecular weight 300,000 available as Polyox WSR-N750 (Union Carbide Corp.);

(d) 60 grams of methylene chloride.

A length of stainless steel wire approximately 0.014 inches in diameter was dipped into this coating solution during 90 seconds. It was then allowed to air dry for approximately 60 minutes. Following this the coated wire was baked for 60 minutes at 200°F. to effect the cure of the coating.

The resulting product was a wire with a flexible adherent coating that, when wetted with water became noticeably lubricious. Repeated rubbing of the wire under running water with moderate finger pressure did not reduce the coating lubricity appreciably.

EXAMPLE 4

A crosslinked polyurea/PVP coating formulation was prepared by weighing the following components into a disposable plastic container:

(a) 1.81 grams of a polyfunctional amine available as Jeffamine ED 600 (Texaco Chemical Co.);

(b) 5.31 grams of a 60% solution of a trimethylolpropane-toluene diisocyanate adduct in PMA solvent available as Mondur CB-60N (Bayer Corp.);

(c) 100 grams of methylene chloride;

(d) 5.0 grams of polyvinylpyrrolidone of mean molecular weight of approximately 360,000 available as Kollidon 90 (BASF Corp.).

A length of stainless steel wire approximately 0.014 inches in diameter was dipped into this coating solution during 90 seconds. It was then allowed to air dry for approximately 60 minutes. Following this the coated wire was baked for 60 minutes at 225° F. to effect the cure of the coating.

The resulting product was a wire with a flexible adherent coating that, when wetted with water became noticeably lubricious. When this wire was rubbed with moderate finger pressure under running water, some loss of lubricity was noted. However, this coating may exhibit enough durability for certain applications.

EXAMPLE 5

A crosslinked polyurea/PVP coating formulation was prepared by weighing the following components into a disposable plastic container:

(a) 1.27 grams of a polyfunctional amine available as Jeffamine ED-600 (Texaco Chemical Company);

(b) 3.72 grams of a 60% solution of a trimethylolpropane-toluene diisocyanate adduct in PMA solvent available as Mondur CB-60N (Bayer Corp.);

(c) 330 grams of methylene chloride;

(d) 5.0 grams of polyvinylpyrrolidone of mean molecular weight of approximately 360,000 available as Kollidon 90 (BASF Corp.).

A length of thermoplastic polyurethane tubing available as Texin 480A (Bayer Corp.) approximately 0.070 inches in diameter was dipped into this coating solution during 60 seconds. It was then allowed to air dry for approximately 60 minutes. Following this the coated tubing was baked for 60 minutes at 225° F. to effect the cure of the coating.

The resulting product was a length of tubing with a flexible adherent coating that, when wetted with water became very lubricious. When rubbed with moderate finger pressure under running water, no loss of lubricity was noted.

EXAMPLE 6

A crosslinked polyurea//PVP coating formulation was prepared by weighing the following components into a disposable plastic container:

(a) 1.81 grams of a polyfunctional amine available as Jeffamine ED-600 (Texaco Chemical Company);

(b) 5.31 grams of a 60% solution of a trimethylolpropane-toluene diisocyanate adduct in PMA solvent available as Mondur CB-60N (Bayer Corp.);

(c) 100 grams of methylene chloride;

(d) 5.0 grams of polyvinylpyrrolidone of mean molecular weight of approximately 360,000 available as Kollidon 90 (BASF Corp.).

A length of stainless steel wire approximately 0.014 inches in diameter was dipped into this coating solution during 90 seconds. It was then allowed to air dry for approximately 60 minutes. Following this the coated wire was baked for 60 minutes at 225° F. to effect the cure of the coating.

The resulting product was a wire with a flexible adherent coating that, when wetted with water became very lubricious. When this wire was rubbed with moderate finger pressure under running water, some loss of lubricity was noted. However, this coating may exhibit enough durability for certain applications.

EXAMPLE 7

A crosslinked polyurea//PVP coating formulation was prepared by weighing the following components into a disposable plastic container:

(a) 1.79 grams of a polyfunctional amine available as Jeffamine ED-600 (Texaco Chemical Company);

(b) 5.27 grams of a 60% solution of a trimethylolpropane-toluene diisocyanate adduct in PMA solvent available as Mondur CB-60N (Bayer Corp.);

(c) 100 grams of a 3.3% solution of poly(ethylene oxide) mean molecular weight 300,000 available as Polyox WSR-N750 (Union Carbide Corp.);

(d) 99 grams of methyl benzoate.

A length of stainless steel wire approximately 0.014 inches in diameter was dipped into this coating solution during 90 seconds. It was then allowed to air dry for approximately 60 minutes. Following this the coated wire was baked for 60 minutes at 200° F. to effect the cure of the coating.

The resulting product was a wire with a flexible adherent coating that, when wetted with water became noticeably lubricious. Repeated rubbing of the wire under running water with moderate finger pressure did not reduce the coating lubricity appreciably.

Referring now to FIG. 1 and FIG. 2 there is shown a medical tubing 1 having coated thereon a crosslinked polyurea-PEO or crosslinked polyurea-PVP coating 2 of this invention.

As indicated earlier, FIG. 3 shows a plastic medical guidewire 3 containing a lubricious crosslinked polyurea-PEO or crosslinked polyurea-PVP coating 4 of this invention. The plastic jacketed medical guidewire comprises a metallic wire core 5 surrounded by plastic jacket 6 at its proximal end. There is provided a softer plastic or elastomeric jacket 7 which surrounds both the plastic jacket 6 and the metal wire core 5 at its distal end.

Figure 4:
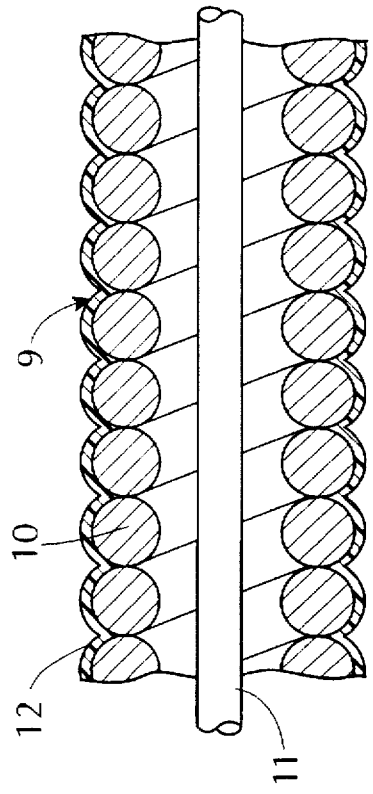
FIG. 4 is a cross-sectional view of the body of a spring guidewire comprising a stainless steel or other metallic winding wire through which a core wire passes, said winding wire having coated thereon a lubricious crosslinked polyurea-PEO or crosslinked polyurea-PVP coating of this invention.

FIG. 4 illustrates a cross-section view of a medical spring guidewire 9 comprising a stainless steel or other metallic winding wire 10 through which metallic core wire 11 passes said winding wire 10 having coated thereon a lubricious crosslinked polyurea-PEO or crosslinked polyurea-PVP coating 12 of this invention.

Figure 5:
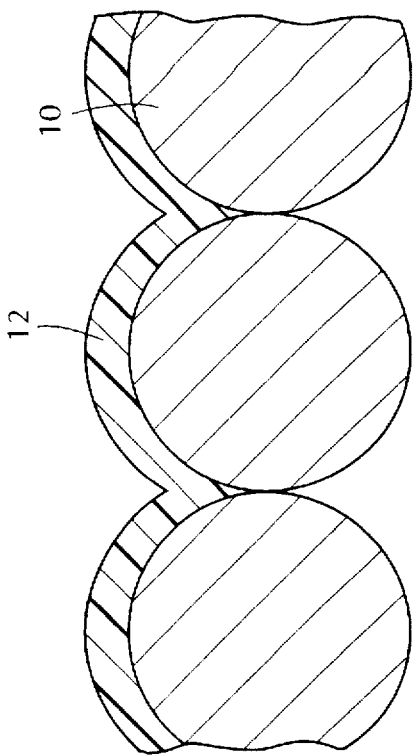
FIG. 5 is an enlarged cross-sectional view of an interface of a segment of the winding wire and coating shown in FIG. 4.

As shown in FIG. 5, which is an enlarged cross-sectional view of a segment of the winding wire 10 of FIG. 4, there is coated on the outer surface thereon a lubricious crosslinked polyurea-PEO or crosslinked PVP coating 12.

Figure 6:
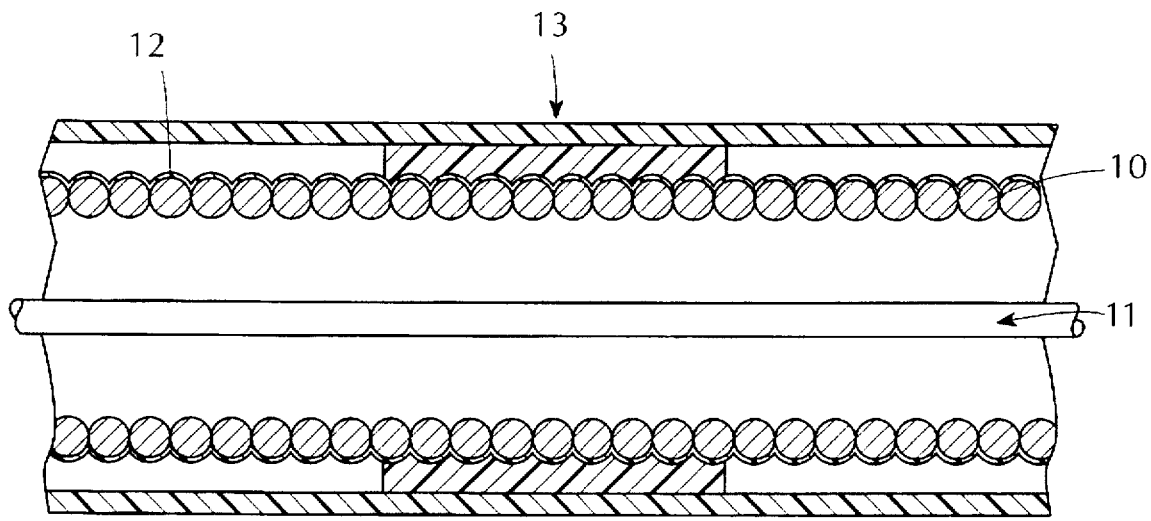
FIG. 6 is a cross-sectional view of a section of catheter tubing into which the lubricious coated steel or other metallic guidewire shown in FIGS. 4 and 5 is inserted.

As shown in FIG. 6, there is provided a catheter tubing 13 into which passes the coated guidewire shown in FIGS. 4 and 5.

Figure 7:
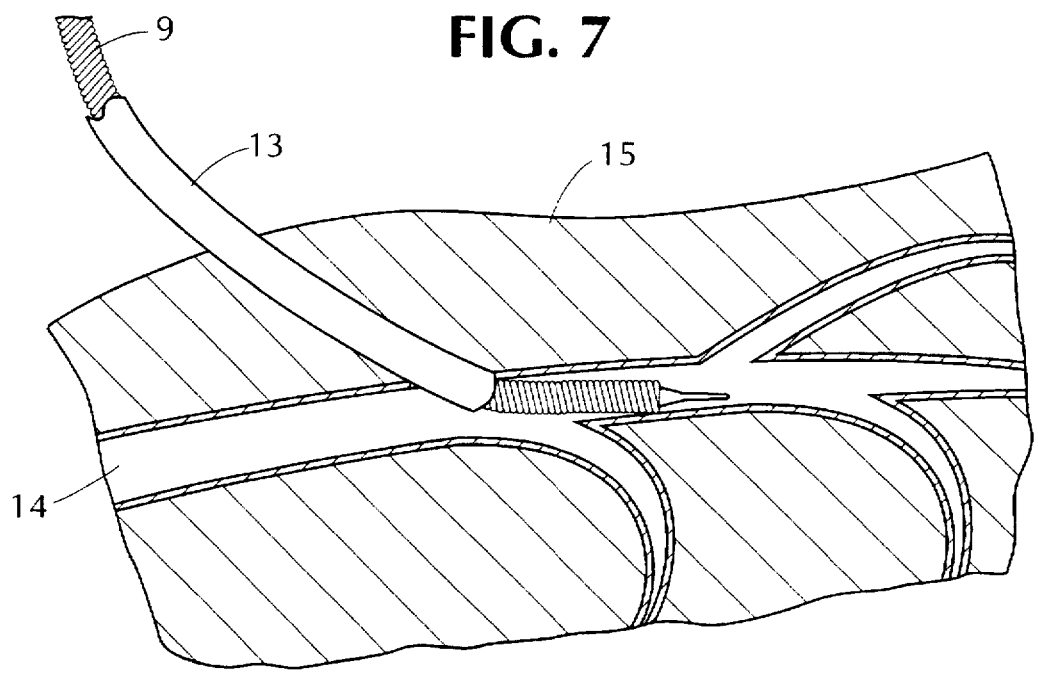
FIG. 7 is a perspective view of the guidewire and catheter shown in FIG. 6 in a blood vessel with the catheter being shown advancing over the guidewire.

As shown in FIG. 7, the catheter 13 of FIG. 6 is shown advancing over the guidewire of FIG. 6 located in lumen 14 of a blood vessel which traverses the tissue 15.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. A hydrophilic, lubricious, durable, flexible, coating comprising a crosslinked polyurea complexed with a hydrophilic polymer selected from the group consisting of poly(ethylene oxide) and polyvinylpyrrolidone said crosslinked polymer formed from the reaction of an isocyanate and a compound having at least two active hydrogens per molecule selected from the group consisting of polyamines, polymercaptans, and polycarboxylates or compounds with NH, $NH_2$, SH or COOH groups on same molecule in the presence of said hydrophilic polymer, with the total sum of the average isocyanate functionality plus the average active hydrogen functionality exceeding 4 and the molar ratio of total NCO groups to total active hydrogens being at least 0.8.

2. A hydrophilic lubricious organic coating as in claim 1 wherein the hydrophilic polymer is a poly(ethylene oxide).

3. A hydrophilic, lubricious organic coating as in claim 1 wherein the hydrophilic polymer is a polyvinylpyrrolidone.

4. A hydrophilic, lubricious coating according to claim 1 wherein in addition to said active hydrogen containing compound there is also included a polyol or a compound containing a combination of OH and NH, $NH_2$, SH, or COOH or other active hydrogen groups.

5. An article comprising a substrate and a durable, flexible hydrophilic, lubricious organic coating adhered thereto, said coating formed from the reaction on the surface of the substrate to be coated, of a mixture comprising an isocyanate, a compound having at least two active hydrogens per molecule selected from the group consisting of polyamines, polymercaptans, and polycarboxylates or compounds with NH, $NH_2$, SH or COOH groups on same molecule, in the presence of said hydrophilic polymer, with the total sum of the average isocyanate functionality plus the average active hydrogen functionality exceeding 4 and the molar ratio of total NCO group to total active hydrogens being at least 0.8 and a hydrophilic polymer selected from the group consisting of a poly(ethylene oxide) and a polyvinylpyrrolidone in a carrier liquid to form a coating of a crosslinked polyurea matrix complexed with the hydrophilic polymer having good adherence to the substrate and a very low coefficient of friction when wetted with water.

6. An article according claim 5 wherein the hydrophilic polymer is a poly(ethylene oxide).

7. An article according to claim 5 wherein the hydrophilic polymer is a polyvinylpyrrolidone.

8. An article according to claim 6 wherein the substrate is an inorganic substrate.

9. An article according to claim 8 wherein the substrate is a metallic substrate.

10. An article according to claim 5 wherein in addition to said active hydrogen containing compound there is also included a polyol or a compound containing a combination of OH, NH, $NH_2$, SH or COOH or other active hydrogen groups.

11. A method of preparing a durable, flexible hydrophilic lubricious, organic coating on a substrate to be coated; said method comprising forming a coating mixture of an isocyanate, and a compound having at least two active hydrogens per molecule selected from the group consisting of polyamines, polymercaptans, and polycarboxylates or compounds with NH, $NH_2$, SH or COOH groups on same molecule in the presence of said hydrophilic polymer, with the total sum of the average isocyanate functionality plus the average active hydrogen functionality exceeding 4 and the molar ratio of total NCO groups to total active hydrogens being at least 0.8, the resulting polymer matrix formed in situ upon curing being a crosslinked polyurea and a hydrophilic polymer selected from the group consisting of a poly(ethylene oxide) and a polyvinylpyrrolidone in a carrier liquid applying said mixture to the substrate, removing at least a portion of said carrier diluent, and then curing to form a coating of a crosslinked polyurea - hydrophilic polymer, said coating having good adherence to the substrate and good antifriction properties.

12. A method of preparing a hydrophilic lubricious organic coating on a substrate as in claim 10 wherein the hydrophilic polymer is a poly(ethylene oxide).

13. A method of preparing a hydrophilic lubricious organic coating on a substrate as in claim 10 wherein the hydrophilic polymer is a polyvinylpyrrolidone.

14. A method of preparing a hydrophilic lubricious coating on a substrate according to claim 11 whereon the substrate is an inorganic substrate.

15. A method of preparing a hydrophilic lubricious coating on a substrate according to claim 14 wherein the substrate is a metallic substrate.

16. A method of preparing a hydrophilic lubricious coating on a substrate according to claim 11 wherein in addition to said active hydrogen containing compound there is also included a polyol or a compound containing a combination of OH and HN, SH or COOH or other active hydrogen groups.

* * * * *